United States Patent
Sood

(10) Patent No.: US 7,715,439 B2
(45) Date of Patent: May 11, 2010

(54) SYSTEMS AND METHODS FOR SHIFTING THE POSITION OF A SYMBOL TO REDUCE TRANSMISSION OVERHEAD

(75) Inventor: Prem L. Sood, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 365 days.

(21) Appl. No.: 11/753,442

(22) Filed: May 24, 2007

(65) Prior Publication Data

US 2008/0187059 A1 Aug. 7, 2008

Related U.S. Application Data

(60) Provisional application No. 60/888,255, filed on Feb. 5, 2007.

(51) Int. Cl.
*H04J 3/18* (2006.01)
*H04J 3/06* (2006.01)

(52) U.S. Cl. ...................................... 370/477; 370/350
(58) Field of Classification Search ................. 370/350, 370/477, 510, 349, 470, 476; 375/354
See application file for complete search history.

(56) References Cited

OTHER PUBLICATIONS

3GPP TSG RAN WG2 submission R2-063657, LS on Primary BCH Transmission, Nov. 2006.
3GPP TSG RAN1 WG1 submission R1-070606, Reply LS on Primary BCH Transmission, Jan. 2006.
3GPP TS25.402 submission V6.5.0, Synchronization in UTRAN Stage 2, Dec. 2006.

*Primary Examiner*—Brian D Nguyen
(74) *Attorney, Agent, or Firm*—Austin Rapp & Hardman

(57) ABSTRACT

A method for shifting the position of a symbol to reduce transmission overhead is described. A frame with a plurality of symbols is provided. A determination is made whether the frame includes an indication of an event. At least one symbol of the plurality of symbols is shifted based on the determination. A counter is set to an initial value. The frame with the at least one shifted symbol is transmitted.

20 Claims, 10 Drawing Sheets

SYSTEMS AND METHODS FOR SHIFTING THE POSITION OF A SYMBOL TO REDUCE TRANSMISSION OVERHEAD

RELATED APPLICATIONS

This application is related to and claims priority from U.S. Provisional Patent Application Ser. No. 60/888,255 filed Feb. 5, 2007, for SFN SYNCHRONIZATION WITHOUT BCH BITS FOR LTE, with inventor Prem Sood, which is incorporated herein by reference.

TECHNICAL FIELD

The present invention relates generally to data communications and wireless data communications. More specifically, the present invention relates to systems and methods for shifting the position of a symbol to reduce transmission overhead.

BACKGROUND

A wireless communication system typically includes a base station in wireless communication with a plurality of user devices (which may also be referred to as mobile stations, user equipment, subscriber units, access terminals, terminals, etc.). The base station transmits data to the user devices over a radio frequency (RF) communication channel. The term "downlink" refers to transmission from a base station to a user device, while the term "uplink" refers to transmission from a user device to a base station.

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union.

Wireless communications systems (e.g., Time Division Multiple Access (TDMA), Orthogonal Frequency-Division Multiplexing (OFDM) and Wideband Code Division Multiple Access (WCDMA)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmits a reference signal. In addition to reference signals, data may be transmitted between a base station and a mobile station. Data may be included in one or more frames of varying lengths. The base station and mobile station attempt to achieve synchronization in order to properly receive and transmit the data. Overhead caused by constantly transmitting synchronization information between the base station and mobile station may cause an undue load on a system. As such, benefits may be realized from systems and methods that reduce the transmission overhead caused from transmitting and receiving synchronization information.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
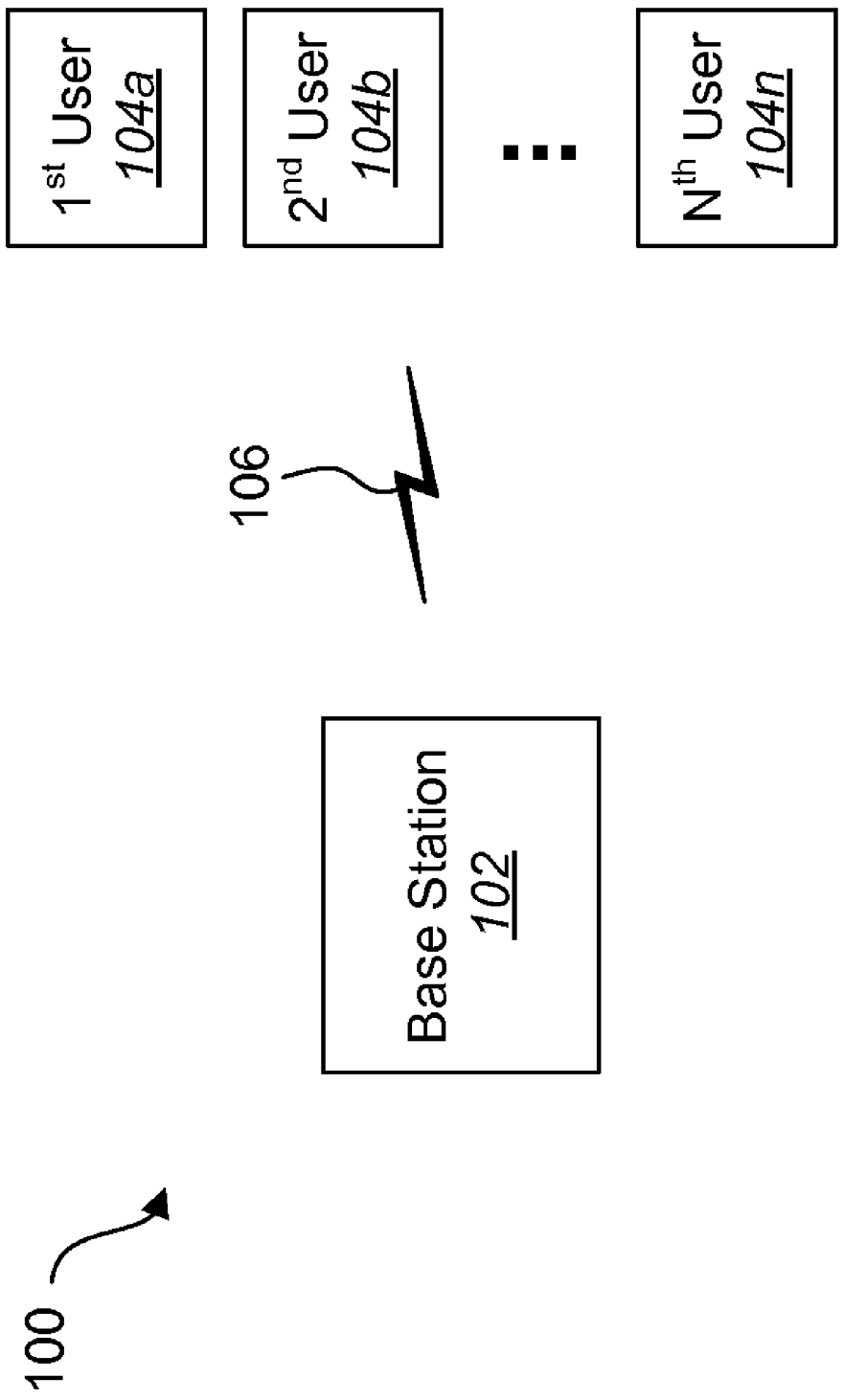
FIG. 1 illustrates an exemplary wireless communication system in which embodiments may be practiced.

A method for shifting the position of a symbol to reduce transmission overhead is described. A frame with a plurality of symbols is provided. A determination is made whether the frame includes an indication of an event. At least one symbol of the plurality of symbols is shifted if it is determined that the frame includes an indication of an event. A counter is set to an initial value if the at least one symbol of the plurality of symbols is shifted. The frame is transmitted.

In one embodiment, the frame is a Long Term Evolution frame with a length of 10 milliseconds (ms). A determination is made whether the frame indicates an end of a superframe. The superframe may comprise 4096 frames. A counter value of an adjacent cell may be obtained.

The frame may comprise a synchronization channel. The synchronization channel may comprise two synch symbols. In one embodiment, the two synch symbols repeat twice in the frame. The two synch symbols may repeat every 5 ms in a frame of length 10 ms.

The one or more symbols may be shifted forward in the frame. In another embodiment, the one or more symbols are shifted backward in the frame. One or more tiered sets of a plurality of position identifiers may be created to identify the event.

An apparatus configured to shift the position of a symbol to reduce transmission overhead is also described. The apparatus includes a processor and memory in electronic communication with the processor. Instructions are stored in the memory. A frame is provided with a plurality of symbols. A determination is made whether the frame includes an indication of an event. At least one symbol of the plurality of symbols is shifted if it is determined that the frame includes an indication of an event. A counter is set to an initial value if the at least one symbol of the plurality of symbols is shifted. The frame is transmitted.

A computer-readable medium comprising executable instructions is also described. A frame is provided with a plurality of symbols. A determination is made whether the frame includes an indication of an event. At least one symbol of the plurality of symbols is shifted if it is determined that the frame includes an indication of an event. A counter is set to an initial value if the at least one symbol of the plurality of symbols is shifted. The frame is transmitted.

A method for synchronizing a counter of a receiver to a counter of a transmitter is also described. A frame with a plurality of symbols is received. A determination is made if at least one of the plurality of symbols is shifted. A counter value is initialized to an initial value if the at least one symbol of the plurality of symbols is shifted. Transmissions from at least one adjacent cell are monitored. A counter value for the monitored cell is determined. The counter is set to match the determined counter value.

A method for establishing a difference in counter values is also described. Communications with at least one base station in a different cell are established. A first counter value is obtained from at least one base station in the different cell. A difference between a second counter value and the first counter value is determined. The difference between the second counter value and the first counter value is transmitted.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The $3^{rd}$ Generation Partnership Project (3GPP) Universal Mobile Telecommunications System (UMTS) Wideband Code Division Multiple Access (WCDMA) standards use a System-Frame Numbering scheme. In the present application, the System-Frame Numbering scheme will also be referred to as a Super-Frame Number (SFN). In one embodiment, the SFN is used to control and schedule various events and activities that are performed on a mobile station on an infrequent basis. For example, the SFN schedules events and activities that occur less frequently than a frame length of 10 milliseconds (ms) that is transmitted from a base station. The SFN also enables power savings for the mobile station by causing the mobile station to sleep for a long period of time and then waking up the mobile station to perform these infrequent events and activities. An example may include the mobile station monitoring one or more paging channels during an idle mode.

Currently, a Long Term Evolution (LTE of the 3GPP System, also called an LTE System) radio frame (herein referred to as a frame) has a length of 10 ms. The frame may include 10 subframes with each subframe having a length of 1 ms. Each subframe may include 2 slots with a length of 0.5 ms each. Each of the 2 slots may include 7 symbols, thus each subframe includes 14 symbols and each frame of 10 ms includes 140 symbols. As such, each half frame includes 70 symbols.

In one embodiment, each of the LTE frames carries a synchronization channel (SCH) which includes 2 synch symbols. The 2 synch symbols may be a primary-SCH (P-SCH) and a secondary-SCH (S-SCH). Nominally, this SCH symbol-pair of 1 P-SCH and 1 S-SCH repeats twice every frame of 10 ms, i.e. it repeats every 5 ms.

A base station with a current 3GPP system may frequently transmit an SFN counter value at regular intervals to a mobile station on a cell broadcast channel (BCH). The SFN counter value may assist the mobile station to sync to an SFN corresponding to the cell of the transmitting base station. The transmitted SFN counter value increments by 1 for each frame of 10 ms and recycles to 0 after a count of 4095 frames. In other words, 4096 frames may equal one Superframe. Constant and regular transmissions of the SFN counter value are inefficient and consume a large portion of a systems' capacity. The present systems and methods implement a SFN counting and identifying scheme which eliminates this overload and load over the air.

FIG. 1 illustrates an exemplary wireless communication system 100 in which embodiments may be practiced. A base station 102 is in wireless communication with a plurality of user devices 104 (which may also be referred to as mobile stations, user equipment, subscriber units, access terminals, terminals, etc.). A first user device 104a, a second user device 104b, and an Nth user device 104n are shown in FIG. 1. The base station 102 transmits data to the user devices 104 over a radio frequency (RF) communication channel 106. The transmitted data may include a plurality of LTE frames. Each of the LTE frames may include a length of 10 ms.

Figure 2:
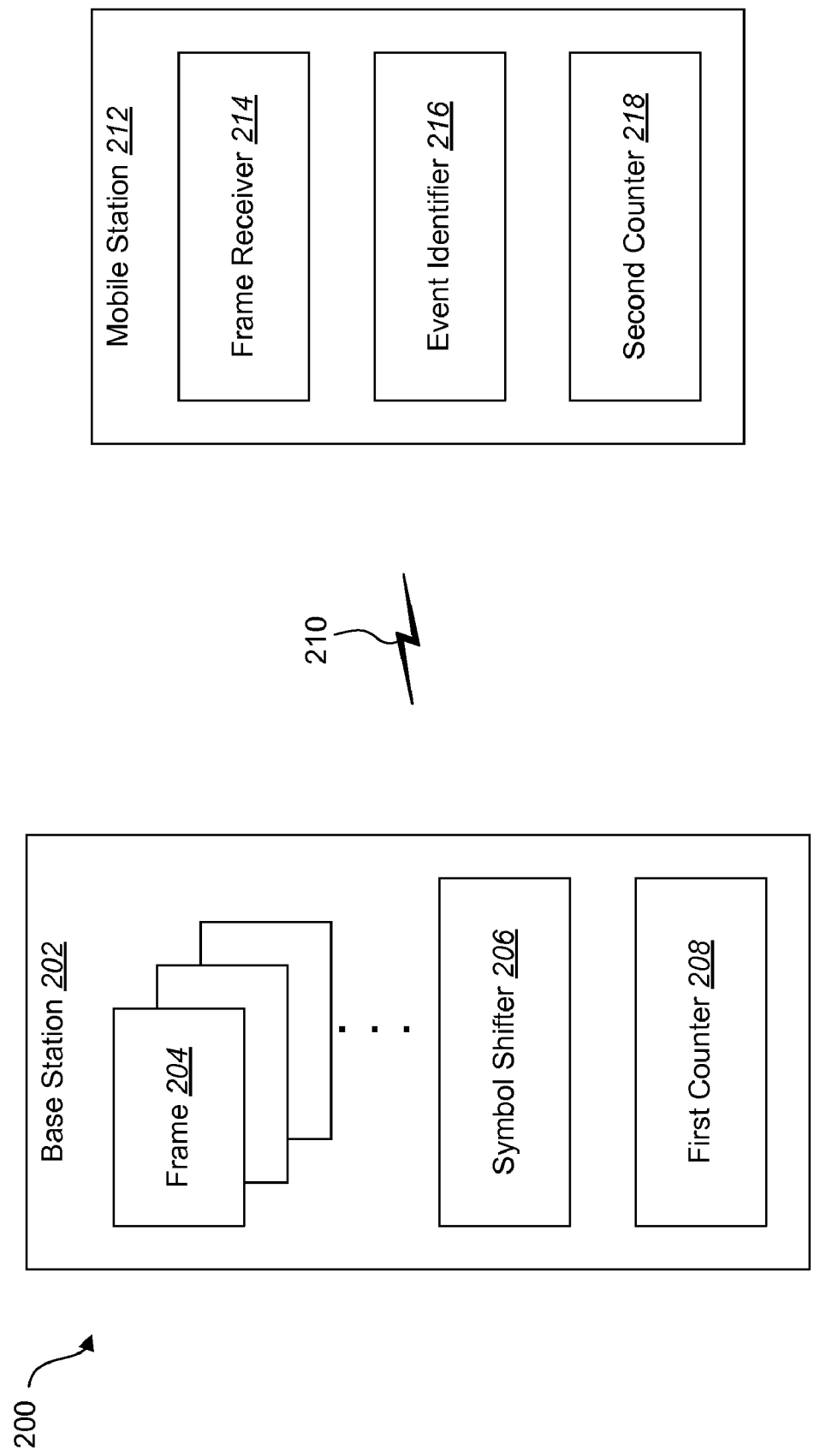
FIG. 2 is a block diagram further illustrating an exemplary wireless communication system.

FIG. 2 is a block diagram further illustrating an exemplary wireless communication system 200. A base station 202 is in wireless communication with a mobile station 212. The base station 202 may include a plurality of frames 204. The plurality of frames 204 may include LTE frames that have a length of 10 ms. Each of the plurality of frames 204 may also include one or more symbols. In one embodiment, each of the plurality of frames 204 includes a P-SCH symbol and an S-SCH symbol, and may also include two P-SCH symbols and two S-SCH symbols.

The base station 202 may also include a symbol shifter 206. The shifter 206 may shift the location of one or more symbols included in the frame 204. For example, one of the plurality of frames 204 may include a pair of P-SCH and S-SCH symbols that repeat every 5 ms. The symbol shifter 206 may shift subsequent occurrences of the pair of P-SCH and S-SCH symbols within a frame so that the subsequent P-SCH and S-SCH pair of symbols within the frame repeat less than or greater than 5 ms after the previous P-SCH and S-SCH symbol pair. In one embodiment, the symbol shifter 206 shifts the symbols within a frame that indicates an event. An event may include the identification of the boundaries of a Superframe. For example, the Superframe may include 4096 LTE frames 204. As such, the symbols within the $4096^{th}$ frame may be shifted to indicate the end of a first Superframe and the beginning of a second Superframe.

The base station 202 may further include a first counter 208. The first counter 208 may increment by 1 each time one of the plurality of frames 204 is transmitted to the mobile station 212. In one embodiment, the first counter 208 resets to zero after the $4096^{th}$ frame 204 has been transmitted to the mobile station 212. The base station 202 transmits each of the plurality of frames 204 to the mobile station 212 over a radio frequency (RF) communication channel 210.

The mobile station 212 may include a frame receiver 214 that receives each of the plurality of frames 204. The mobile station 212 may also include an event identifier 216. The event identifier 216 may identify if a received frame includes an event. For example, the event identifier 216 determines whether symbols within the received frame have been shifted. The mobile station 212 further includes a second counter 218. The second counter 218 may be initialized to zero when the event identifier 216 determines that a received frame includes an event. The second counter 218 may also be synched to the first counter 208 on the base station 202.

Figure 3:
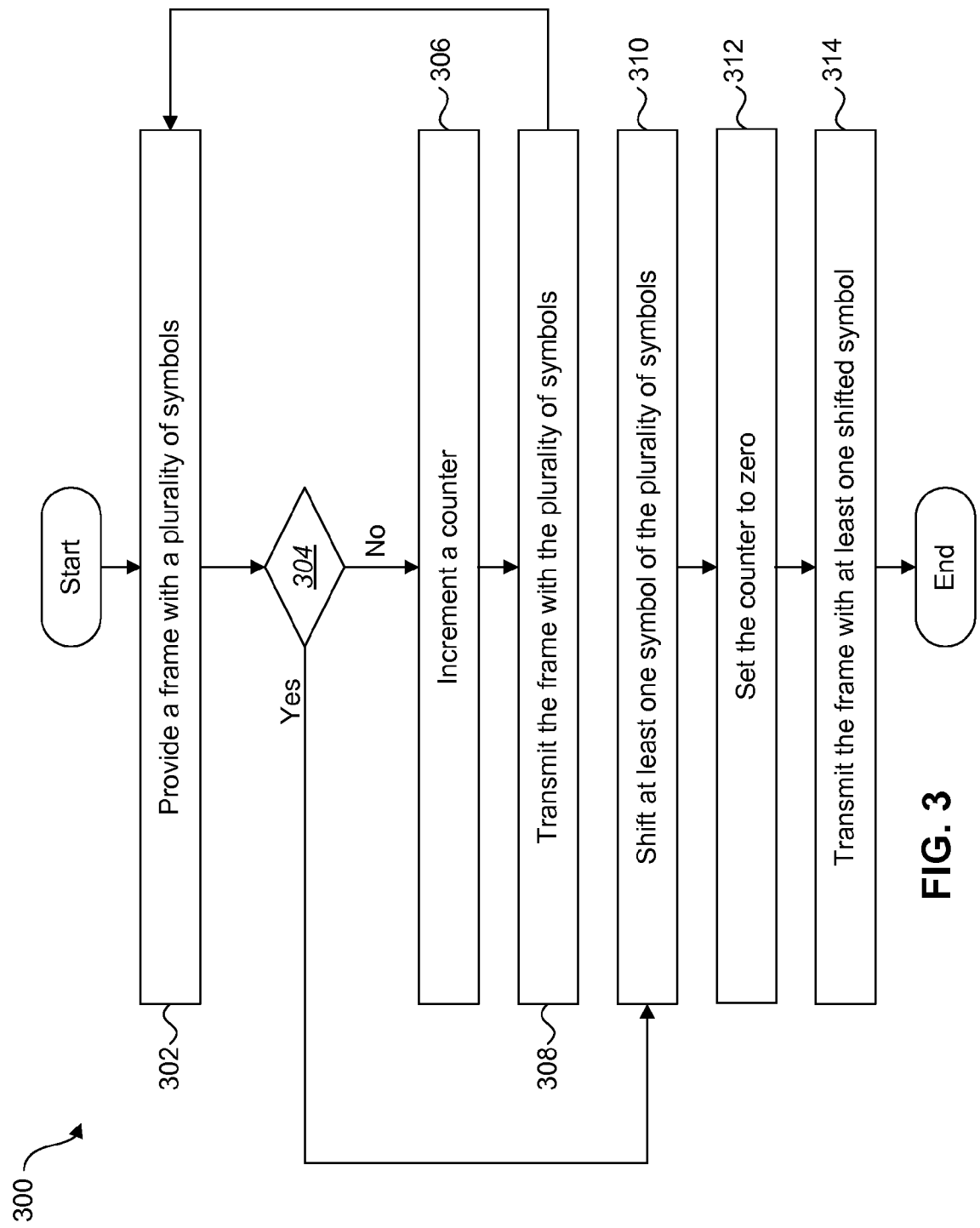
FIG. 3 is a flow diagram illustrating one embodiment of a method for shifting the position of one or more symbols to reduce transmission overhead.

FIG. 3 is a flow diagram illustrating one embodiment of a method 300 for shifting the position of one or more symbols to reduce transmission overhead. The method 300 facilitates the shifting of the position of one or more symbols between consecutive occurrences. For example, in 10 ms LTE frames, there are 2 half frames of 5 ms each and a symbol may be repeated every 5 ms within the 10 ms LTE frame. The method 300 may shift the position of symbols such that in the first half frame, the symbols may be constructed in a different symbol slot than in the second half frame of the same 10 ms LTE frame. In one embodiment, the method 300 is implemented by a base station.

A frame including a plurality of symbols may be provided 302. The frame may be a LTE frame with a length of 10 ms. The plurality of symbols within the frame may include a P-SCH symbol and a S-SCH symbol. The P-SCH and S-SCH symbols may repeat every 5 ms within the frame.

A determination 304 is made whether the frame includes an event. As previously explained, an event may include the frame indicating the boundaries of a Superframe. In one embodiment, the determination 304 determines whether the frame is the $4096^{th}$ frame. If it is determined 304 that the frame does not include an event, a counter is incremented 306. When the counter 306 indicates that 4095 frames have been transmitted, it may be determined 304 that the subsequent frame includes an event. The frame may be transmitted 308 with the plurality of symbols. In one embodiment, the frame is transmitted 308 to a mobile station. The method 300 may again provide 302 a frame with a plurality of symbols.

However, if it is determined 304 that the frame includes an event, at least one symbol of the plurality of symbols is shifted 310 within the frame. In one embodiment, at least one symbol is shifted 310 to repeat less than 5 ms after the previous occurrence of the symbol. In another embodiment, at least one symbol is shifted 310 to repeat more than 5 ms after the previous occurrence of the symbol. The first counter 208 may be set 312 to zero. The frame with at least one shifted symbol may be transmitted 314. In one embodiment, the frame is transmitted 314 to one or more mobile stations. The method 300 is not restricted for the consecutive occurrences of symbols to be within a single frame.

Figure 4:
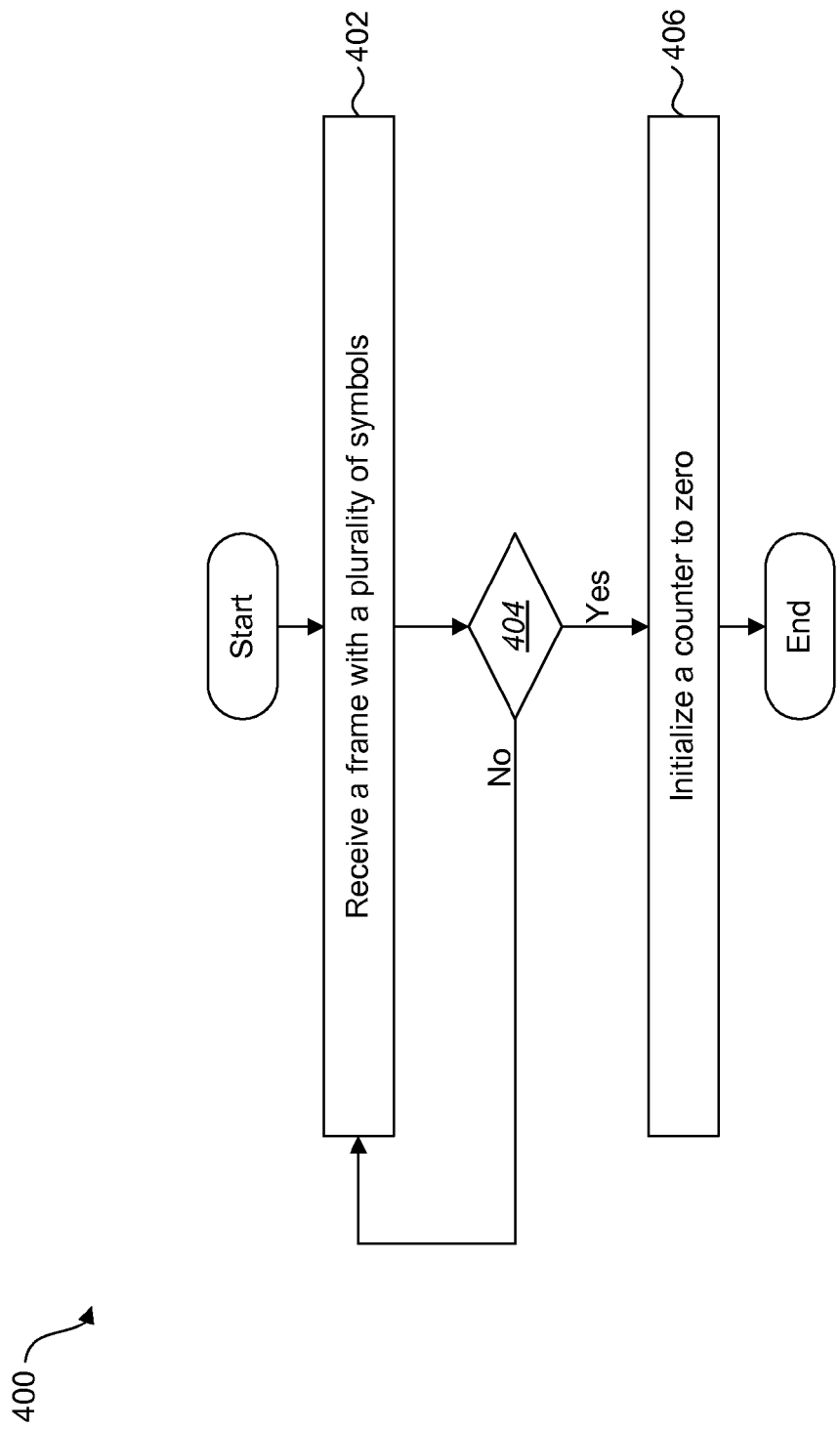
FIG. 4 is a flow diagram illustrating one embodiment of a method for initializing a counter value to zero.

FIG. 4 is a flow diagram illustrating one embodiment of a method 400 for initializing a counter value to zero. The method 400 may be implemented by a mobile station. A frame may be received 402. The received frame may include a plurality of symbols. The symbols may include one or more pairs of the P-SCH symbol and the S-SCH symbol. A determination 404 is made if the received frame indicates the occurrence of an event. In one embodiment, the received frame may indicate the boundaries of a Superframe. For example, the received frame may be the $4096^{th}$ frame received. If it is determined 404 that the received frame does not indicate the occurrence of an event, the method returns to receiving 402 a frame with a plurality of symbols. However, if it is determined 404 that the received frame indicates the occurrence of an event, a counter is initialized 406 to zero. In other words, a counter within a mobile station is initialized to the value of zero when the end of a Superframe has been detected.

Figure 5:
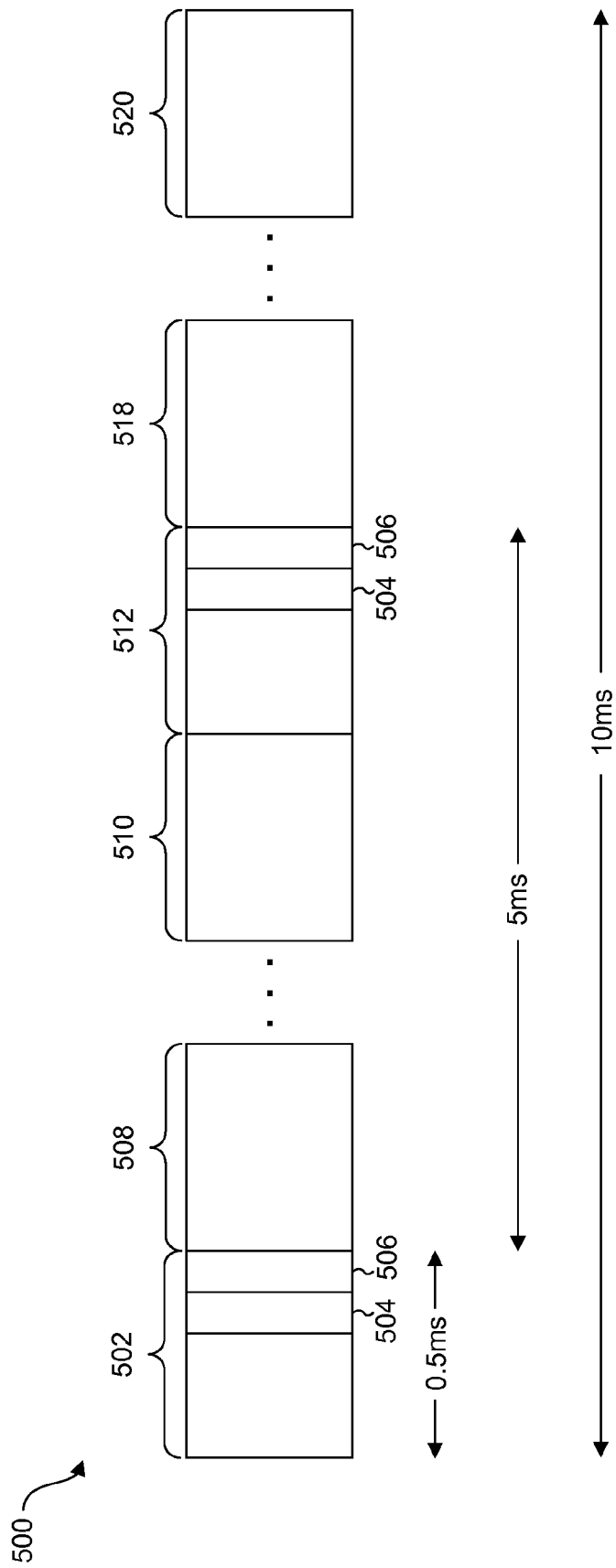
FIG. 5 is a block diagram illustrating one embodiment of a frame.

FIG. 5 is a block diagram illustrating one embodiment of a frame 500. The frame 500 may be an LTE frame with a length of 10 ms. The frame 500 may include a plurality of subframes that each has a length of 1 ms. Each of the plurality of subframes may include slots 502, 508, 510, 512, 518, 520 that each has a length of 0.5 ms. Each slot 502, 508, 510, 512, 518, 520 may include 7 symbols. As such, each subframe may include 14 symbols and the frame 500 may include 140 symbols.

A first slot 502 of length 0.5 ms may include a first symbol 504 and a second symbol 506. The first symbol 504 and the second symbol 506 may each be repeated in a second slot 512. The symbols 504, 506 may be repeated every 5 ms within the 10 ms frame 500 as illustrated. In one embodiment, the detailed content of subsequent occurrences of the first symbol 504 and the second symbol 506 are different in a predetermined manner. In other words, subsequent occurrences may not be identical to the previous occurrences of the first symbol 504 and the second symbol 506.

Figure 6:
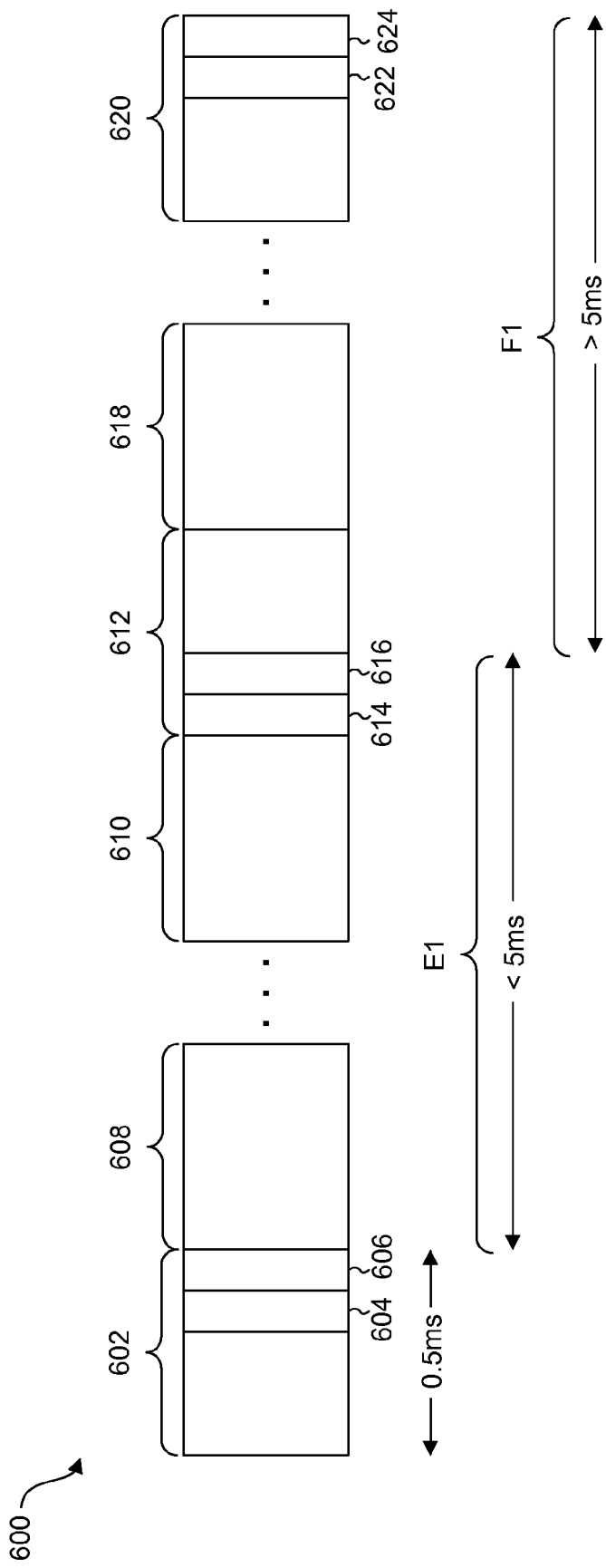
FIG. 6 is a block diagram illustrating a further embodiment of a frame with symbols that have been shifted.

FIG. 6 is a block diagram illustrating a further embodiment of a frame 600 with symbols that have been shifted. In one embodiment, the frame 600 indicates the occurrence of an event. For example, the frame 600 may indicate the boundaries of a Superframe. As previously explained concerning the frame 500 of FIG. 5, the frame 600 may be an LTE frame with a length of 10 ms. The frame 600 may include a plurality of subframes that each has a length of 1 ms. Each of the plurality of subframes may include slots 602, 608, 610, 612, 618, 620 that each has a length of 0.5 ms. Each slot 602, 608, 610, 612, 618, 620 may include 7 symbols. As such, each subframe may include 14 symbols and the frame 600 may include 140 symbols.

A first slot 602 of length 0.5 ms may include a first symbol 604 and a second symbol 606. Subsequent occurrences of the first symbol 604 and the second symbol 606 may be shifted. In one embodiment, the detailed content of subsequent occurrences of the first symbol 604 and the second symbol 606 are different in a predetermined manner. In other words, subsequent occurrences may not be identical to the previous occurrences of the first symbol 604 and the second symbol 606. For example, a second slot 612 of length 0.5 ms may include a first repeated first symbol 614 and a first repeated second symbol 616. The first repeated first symbol 614 and the first repeated second symbol 616 may include detailed content that is different from the first symbol 604 and the second symbol 606.

As illustrated, the first repeated first symbol 614 and the first repeated second symbol 616 occurs less than 5 ms since the occurrence of the first symbol 604 and the second symbol 606. The length between the occurrence of the first symbols 604, 606 and the first repeated symbols 614, 616 may be represented as E1. In another embodiment, a third slot 620 of length 0.5 ms may include a second repeated first symbol 622 and a second repeated second symbol 624. The second repeated symbols 622, 624 occurs more than 5 ms since the occurrence of the first repeated symbols 614, 616 as illustrated. The length between the occurrence of the first repeated symbols 614, 616 and the second repeated symbols 622, 624 may be represented as F1.

In one embodiment, the symbols 604, 606 included in one or more slots 602, 608, 610, 612, 618, 620 may be a P-SCH symbol and an S-SCH symbol. As illustrated, the positions of the SCH symbol pairs are shifted between consecutive occurrences. In other words, in the frame 600, the position of the first SCH pair 604, 606 is constructed in a different symbol position from that of the second SCH pair 614, 616. Combinations of these shifts and differing position shifts may be used to create tiered sets of multiple SFN position identifiers at positions different from the 4096$^{th}$ frame.

The following description illustrates an E1-F1 SCH symbol pair position shift that may be used to identify an SFN Superframe boundary. However, the operation described herein may be similar or identical to other shifts that may be tailored for the unique situation and may create unique position shift combinations.

The position of the first SCH pair 604, 606 in the frame 600 (which may be used to define the Superframe boundary) is not changed. The position of the second SCH pair 614, 616 may be shifted forward. Shifting the second pair 614, 616 forward creates a smaller difference E1 followed by a larger difference F1 between the first SCH pair 604, 606, the second SCH pair 614, 616 and the third SCH pair 622, 624. When the timing of the Superframe has not been decoded, a receiver (such as a mobile station) may see a first SCH symbol pair 604, 606 and a second SCH symbol pair 614, 616 spaced closer together (represented as E1) followed by a third SCH symbol pair 622, 624 with a greater separation (represented as F1). The receiver may be designed to look for the SCH pairs separated first by E1 followed by the next SCH pair at separation F1. The end of the Superframe, or Superframe boundary, may be a defined position after the 2$^{nd}$ S-SCH symbol of the pair forming the separation E1.

As illustrated in FIG. 6, the receiver sees two SCH symbol pairs spaced closer together by one E1 spacing which is followed by a greater separation F1 from the last SCH symbol pair of the E1 spacing. In another embodiment, a 3 SCH symbol pair sequence is used to add protection against a chance of false detection. In the case of 3 SCH symbol pairs, an event, such as the SFN Superframe boundary follows a predefined distance from the last SCH symbol at E1 spacing from previous one or ones, determined by an F1 spacing which is detected instead of an E1 spacing, or regular 5 ms spacing which is detected instead of an E1 spacing. The present systems and methods may also be extended to four or more SCH symbol pairs spaced close together.

Upon detection of a Superframe timing event of a frame boundary, a receiver (mobile station) and a transmitter (base station) initialize their separate counters to zero, which are thus fully synchronized with each other. In one embodiment, the base station does not actually detect a boundary. Instead, the base station creates a frame boundary. The separate counters remain in sync and may be utilized to schedule activities and events at times less frequent than a 10 ms frame time. For example, the counters on the receive side and the transmit side are re-calibrated at every occurrence of an SFN boundary. The receiver may decode the Superframe timing event (Superframe boundary) without the expenditure of the scarce symbol resources to transmit an SFN number continuously over the air.

In an alternative embodiment, the positions of the SCH symbol pairs may be switched. The third symbol pair 622, 624 forming an F1 spacing may be utilized to determine the known end of the Superframe. In a similar manner to the E1-F1 spacing explained above, multiple tiered versions may be created to define events within an SFN, and also events less frequent than one SFN. These multiple tiered events may be defined by using different SCH symbol pair position shifts.

SCH symbol pair shifts may be created to identify tiered events within a Superframe. One example is to create a shift pair G1-H1 which may repeat and identify every 256$^{th}$ frame. As such, 16 G1-H1 pairs may exist in one Superframe of 4096 frames identified by an E1-F1 sequence. These events may be used for activities more frequent than at SFN levels. In addition, the G1-H1 events may serve as counting tick-marks which may be used by a receiver and transmitter to re-calibrate the exact sync position, thus maintaining an exact SFN sync.

In one embodiment, the E1-F1 position shift encompasses the full range of possible symbol positions in the frame 600. Before a position shift occurs, 2 SCH symbol pairs may be spaced 5 ms apart as explained in FIG. 5. In one embodiment, the 2 SCH symbol pairs may be located in symbol positions 69-70 and 139-140. In the frame 600, the first half-frame is not shifted and stays at symbol position 69-70 and the second half frame is shifted forward to symbol positions 135-136. As such, the end of the frame 600 may be counted by the receiver as at the end of the 140 symbols, knowing that the second SCH pair of the 2 SCH pairs forming the E1 spacing is in positions 135-136. A similar calculation may be done using the number of slots and subframes. The actual set of the 2 positions may be chosen based on other system tradeoffs, such as the creation of a tiered position shift scheme or an S-SCH position relative to the P-SCH symbol, which is not necessary to be fixed. However, the separation of the P-SCH symbol and the S-SCH may also be fixed so that the SCH decode may proceed with its position being determined by the P-SCH to S-SCH distance being known. In one embodiment, the S-SCH symbol is adjacent to the P-SCH.

The spacing positions are used above as an example. The second SCH pair may be set to any other suitable symbol positions, i.e. 129-130, 133-134, etc. The present systems and methods may generally be applied even in the case of no slots, by shifting the positions of the SCH's in consecutive frames or frame type entities.

Figure 7:
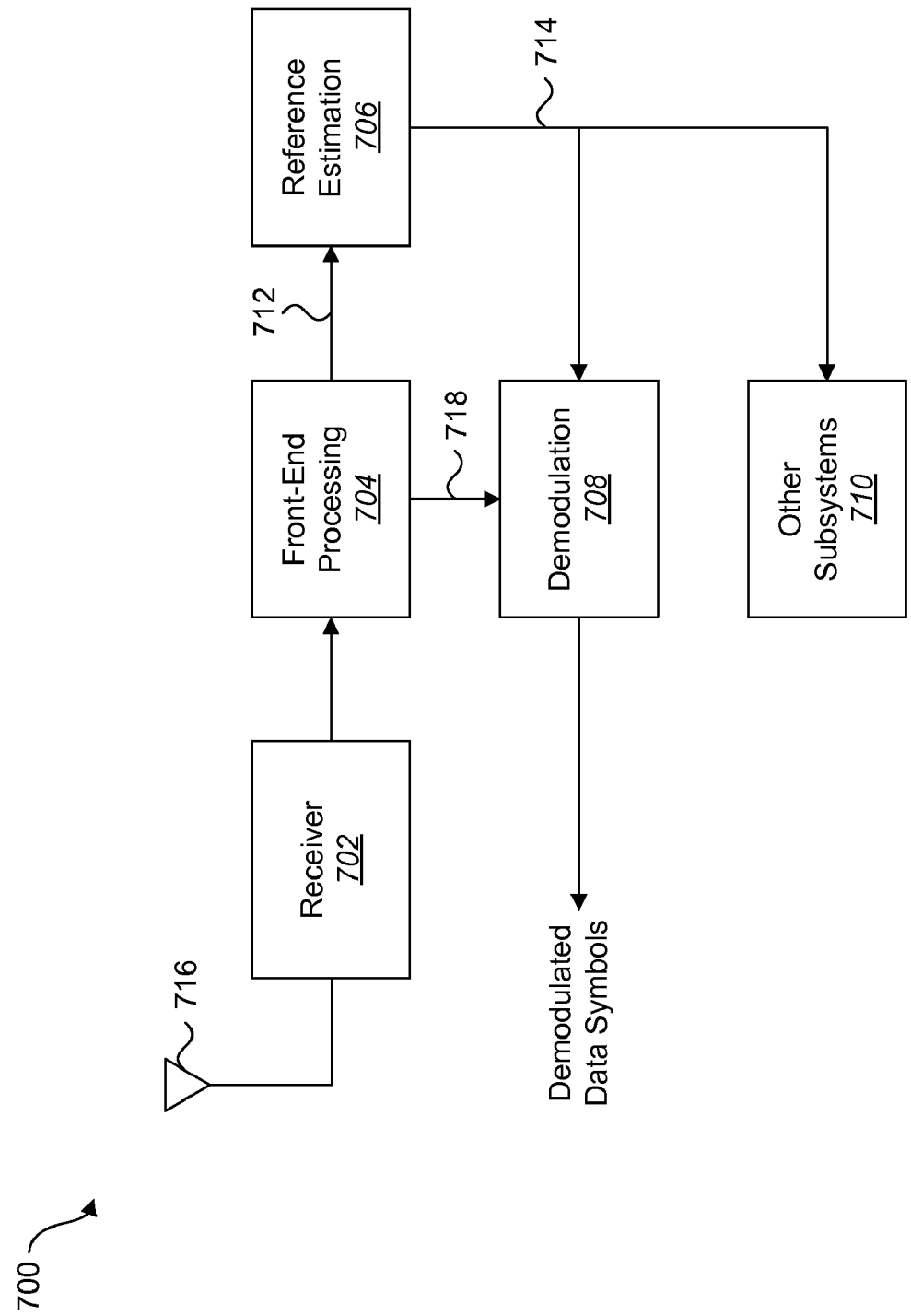
FIG. 7 illustrates a block diagram of certain components in an embodiment of a receiver.

FIG. 7 illustrates a block diagram 700 of certain components in an embodiment of a receiver 702. Other components that are typically included in the receiver 702 may not be illustrated for the purpose of focusing on the novel features of the embodiments herein.

A signal may be received at an antenna 716. In one embodiment, the signal includes data within the plurality of frames 204 sent from the transmitter, base station, etc. The signal is provided by the antenna 716 to the receiver 702. The receiver 702 down-converts the signal and provides it to a front-end processing component 704. The front-end processing component 704 may determine whether one of the plurality of frames 204 indicates the occurrence of an event. The front-end processing component 704 may provide the received signal 712 to a reference estimation component 706. The received reference signal 712 typically includes noise and usually suffers from fading. The front-end processing component 704 may also provide the data 718 to a demodulation component 708 that demodulates the signal.

The reference estimation component 706 may provide an estimated signal 714 to the demodulation component 708. The reference estimation component 706 may also provide the estimated signal 714 to other subsystems 710.

Additional processing takes place at the receiver 702. Generally, the reference estimation component 706 operates to estimate the signal and effectively clean-up the signal by reducing the noise and estimating the original signal that was transmitted.

Figure 8:
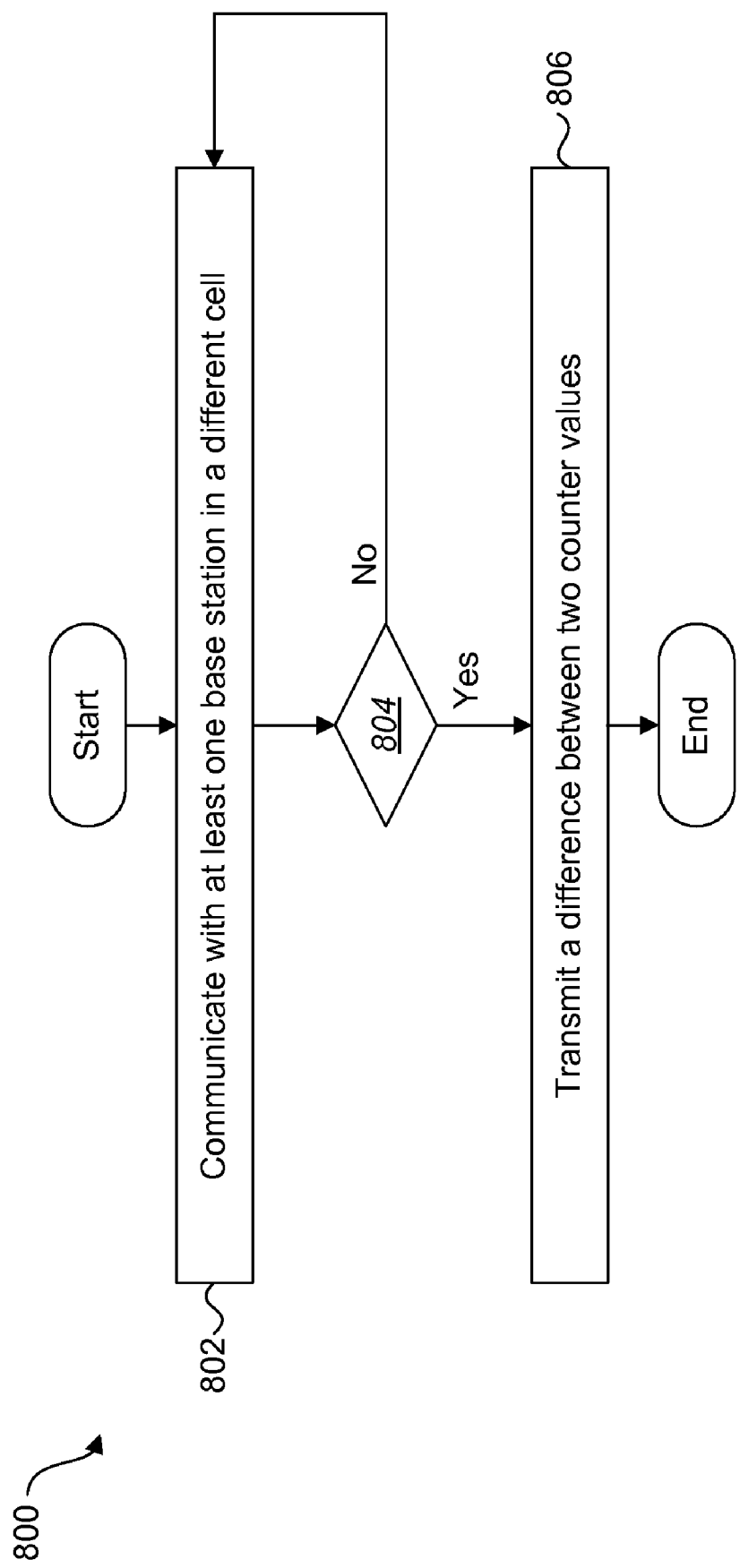
FIG. 8 is a flow diagram illustrating one embodiment of a method to reduce the latency which may be encountered to obtain a mobile station and a base station in Super-Frame Number (SFN) sync.

FIG. 8 is a flow diagram illustrating one embodiment of a method 800 to reduce the latency which may be encountered to obtain a mobile station and a base station in SFN sync. The method 800 may be used to achieve quick sync of the SFN counter on the mobile station by using a counter value on the base station. The method 800 may be implemented by the base station.

In one embodiment, the base station communicates 802 with at least one base station in a different cell. For example, base stations of different cells communicate 802 with each other to inform each other of the SFN-SFN differences between their respective counter values or to get all the base stations in the differing cells in SFN sync with each other. A determination 804 is made if the base station is determined to be on a "master sync" side. If it is determined 804 that the base station is not on the "master sync" side, the base station continues to communicate 802 with at least one base station in a different cell. If it is determined 804 that the base station is on the "master sync" side, the base station transmits 806 or otherwise communicates its current SFN counter value to an unsynchronized side (e.g., another base station in a different cell, or a mobile station). The current SFN counter value that is transmitted 806 or otherwise communicated to the other base station or mobile station may also be the SFN-SFN difference between the current SFN counter value of the base station and the SFN counter value of at least one base station in the different cell. In another embodiment, the determination 804 is not performed and the base stations transmit or otherwise communicate with each other to inform each other of their respective counter values regardless of a "master-sync" status. In another embodiment, the transmitting base station may position shift to communicate its own SFN boundary event and simultaneously broadcast separately to one or more mobile stations the static SFN-SFN differences of one or more base stations in the different cells.

Figure 9:
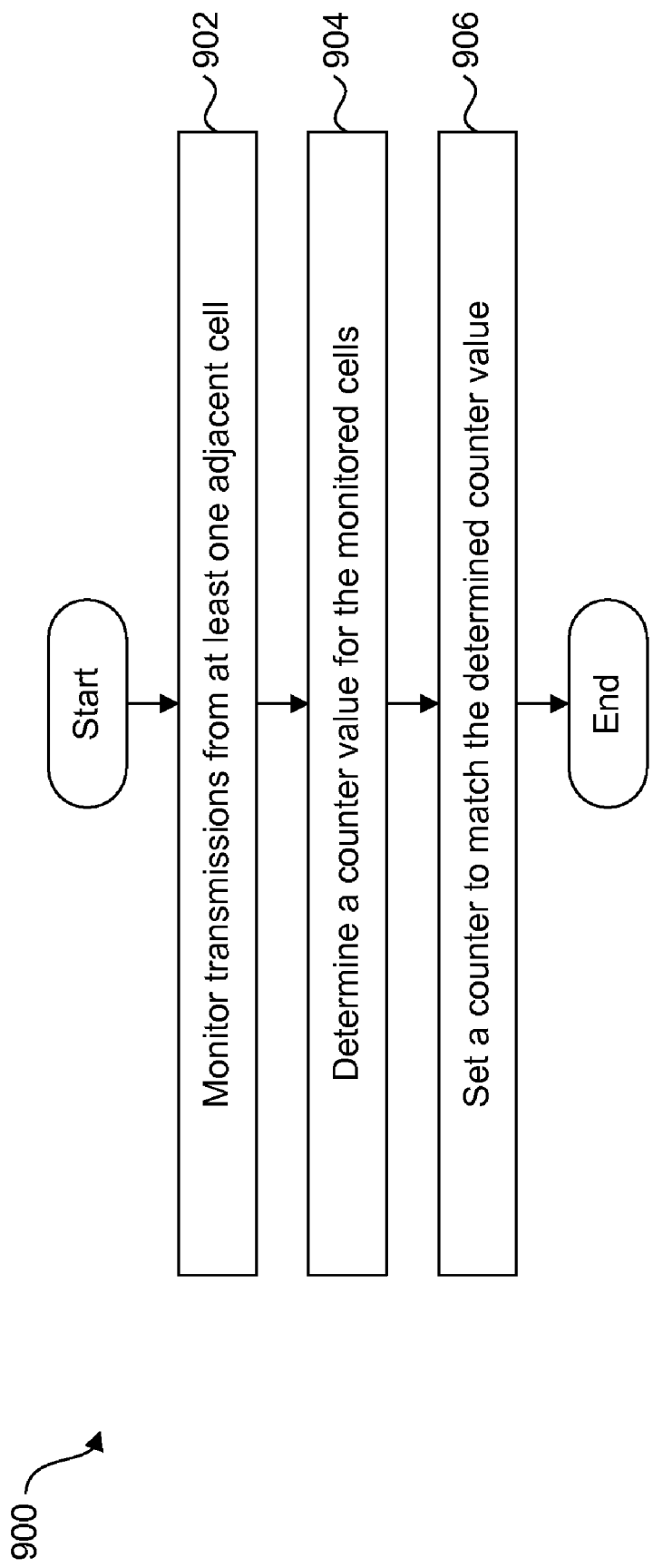
FIG. 9 is a flow diagram illustrating one embodiment of a method for synchronizing a first counter to a second counter.

FIG. 9 is a flow diagram illustrating one embodiment of a method 900 for synching a first counter to a second counter. The method 900 may be used to reduce latency which may be encountered to obtain a mobile station and a base station that are in SFN sync. In one embodiment, the method 900 is implemented by the mobile station.

Transmissions are monitored 902 from at least one adjacent cell to the cell the mobile station is located in. A counter value for the monitored cells is determined 904. A counter within the mobile station is set 906 to match the determined counter value. In another embodiment, the mobile station informs the base station of the adjacent cell SFN counter value.

Figure 10:
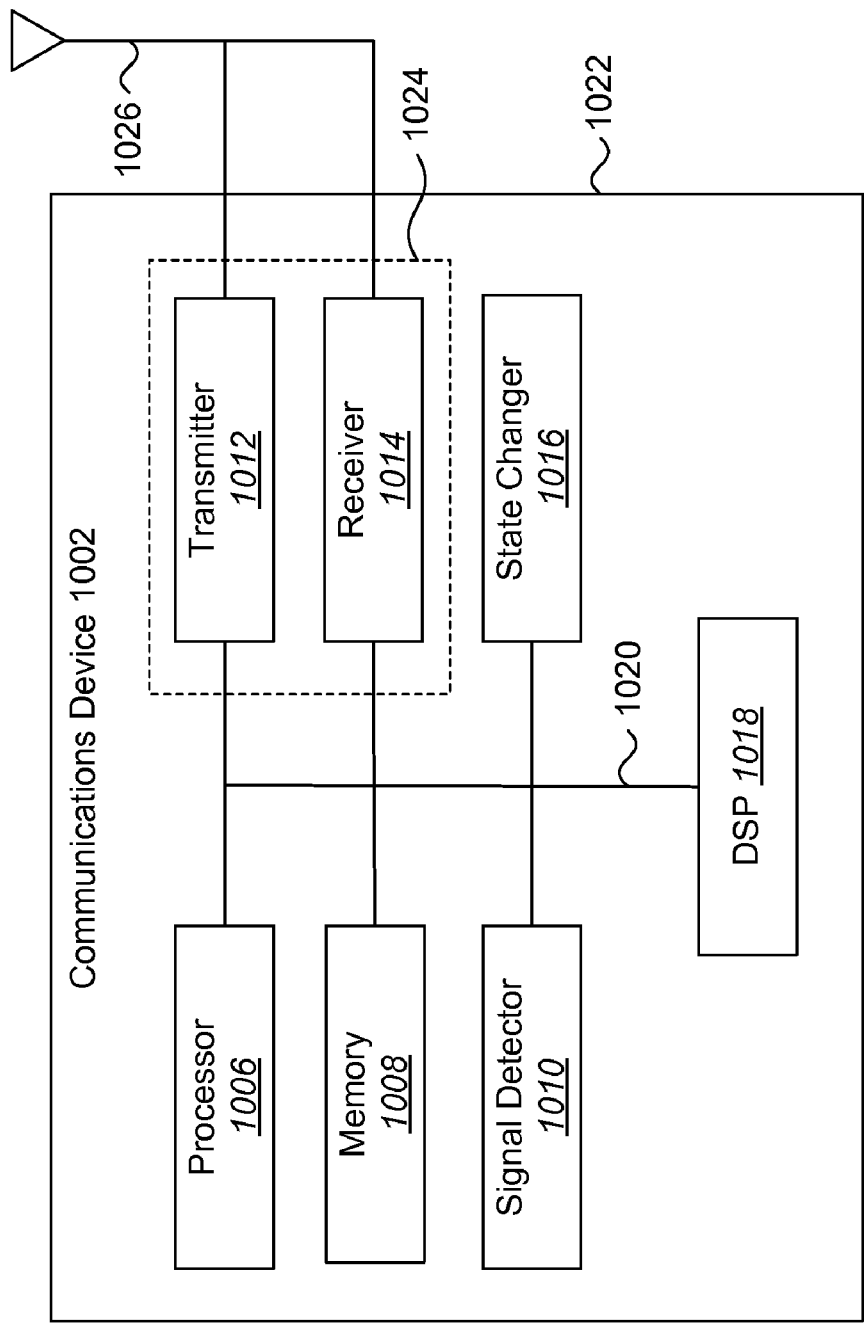
FIG. 10 illustrates various components that may be utilized in a communications device.

FIG. 10 illustrates various components that may be utilized in a communications device 1002. The device 1002 may include a mobile station, base station, etc. The device 1002 includes a processor 1006 which controls operation of the communications device 1002. The processor 1006 may also be referred to as a CPU. Memory 1008, which may include both read-only memory (ROM) and random access memory (RAM), provides instructions and data to the processor 1006. A portion of the memory 1008 may also include non-volatile random access memory (NVRAM).

The communications device 1002 may also include a housing 1022 that contains a transmitter 1012 and a receiver 1014 to allow transmission and reception of data. The transmitter 1012 and receiver 1014 may be combined into a transceiver 1024. An antenna 1026 is attached to the housing 1022 and electrically coupled to the transceiver 1012. Additional antennas (not shown) may also be used.

The device 1002 may also include a signal detector 1010 used to detect and quantify the level of signals received by the transceiver 1024. The signal detector 1010 detects such signals as total energy, pilot energy per pseudonoise (PN) chips, power spectral density, and other signals.

A state changer 1016 controls the state of the device 1002 based on a current state and additional signals received by the transceiver 1024 and detected by the signal detector 1010. The communications device 1002 may be capable of operating in any one of a number of states.

The various components of the device 1002 are coupled together by a bus system 1020 which may include a power bus, a control signal bus, and a status signal bus in addition to a data bus. However, for the sake of clarity, the various buses are illustrated in FIG. 10 as the bus system 1020. The device 1002 may also include a digital signal processor (DSP) 1018 for use in processing signals. The communications device illustrated in FIG. 10 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for shifting the position of a symbol to reduce transmission overhead, the method comprising:
    providing a frame with a plurality of symbols;
    determining, by a processor, whether the frame includes an indication of an event;
    shifting at least one symbol of the plurality of symbols if it is determined that the frame includes an indication of an event;
    setting a counter to an initial value if the at least one symbol of the plurality of symbols is shifted; and
    transmitting the frame.

2. The method of claim 1, wherein the frame is a Long Term Evolution frame with a length of 10 milliseconds (ms).

3. The method of claim 1, further comprising determining whether the frame indicates an end of a superframe.

4. The method of claim 3, wherein the superframe comprises 4096 frames.

5. The method of claim 1, further comprising obtaining a counter value of an adjacent cell.

6. The method of claim 1, wherein the frame comprises a synchronization channel.

7. The method of claim 6, wherein the synchronization channel comprises two synch symbols.

8. The method of claim 7, wherein the two synch symbols repeat twice in the frame.

9. The method of claim 8, wherein the two synch symbols repeat every 5 ms in a frame of length 10 ms.

10. The method of claim 1, further comprising shifting the at least one symbol forward in the frame.

11. The method of claim 1, further comprising shifting the at least one symbol backward in the frame.

12. The method of claim 1, further comprising creating one or more tiered sets of a plurality of position identifiers to identify the event.

13. An apparatus configured to shift the position of a symbol to reduce transmission overhead, the apparatus comprising:
    a processor;
    memory in electronic communication with the processor;
    instructions stored in the memory, the instructions being executable to:
        provide a frame with a plurality of symbols;
        determine whether the frame includes an indication of an event;
        shift at least one symbol of the plurality of symbols if it is determined that the frame includes an indication of an event;
        set a counter to an initial value if the at least one symbol of the plurality of symbols is shifted; and
        transmit the frame.

14. The apparatus of claim 13, wherein the frame is a Long Term Evolution frame with a length of 10 ms.

15. The apparatus of claim 13, wherein the instructions are further executable to determine whether the frame indicates an end of a superframe.

16. The apparatus of claim 15, wherein the superframe comprises 4096 frames.

17. The apparatus of claim 13, wherein the instructions are further executable to obtain a counter value of an adjacent cell.

18. The apparatus of claim 13, wherein the frame comprises a synchronization channel.

19. The apparatus of claim 18, wherein the synchronization channel comprises two synch symbols.

20. A computer-readable medium stored thereon computer-executable instructions, which when executed by a processor cause the processor to perform:
    providing a frame with a plurality of symbols;
    determining whether the frame includes an indication of an event;
    shifting at least one symbol of the plurality of symbols if it is determined that the frame includes an indication of an event;
    setting a counter to an initial value if the at least one symbol of the plurality of symbols is shifted; and
    transmitting the frame.

* * * * *